C. H. ERWAY.
PLANTER SHOE.
APPLICATION FILED APR. 29, 1918.
1,318,365.
Patented Oct. 14, 1919.
2 SHEETS—SHEET 1.
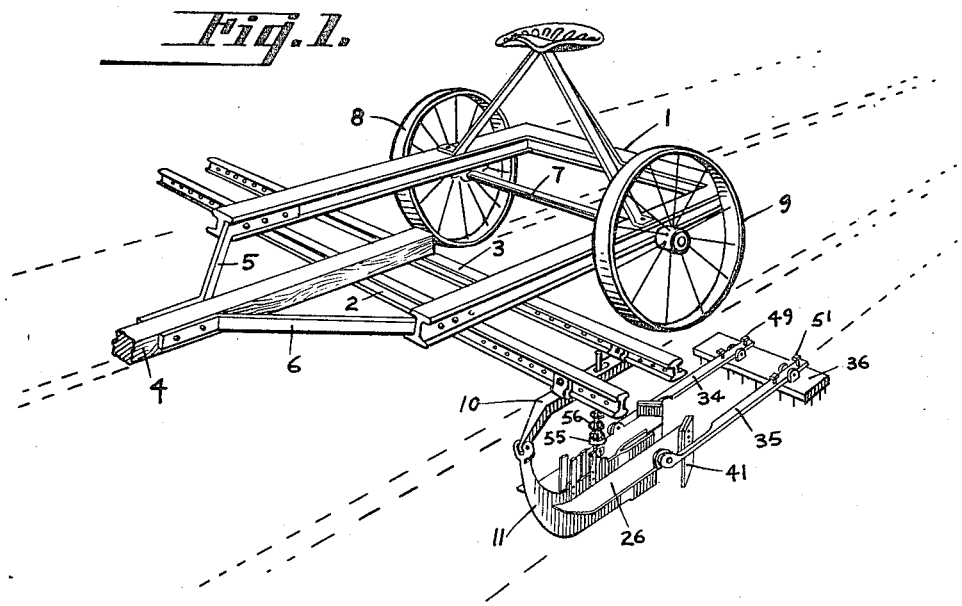
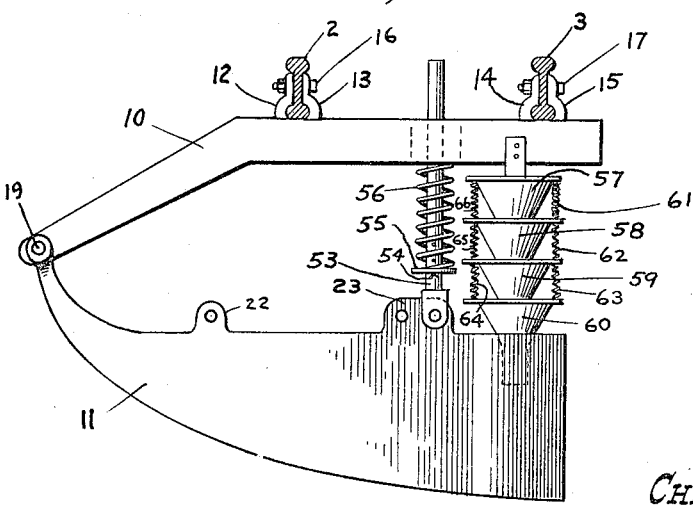
INVENTOR.
CHARLES H. ERWAY
BY
Carlos P. Griffin
ATTORNEY.

C. H. ERWAY.
PLANTER SHOE.
APPLICATION FILED APR. 29, 1918.
1,318,365.
Patented Oct. 14, 1919.
2 SHEETS—SHEET 2.
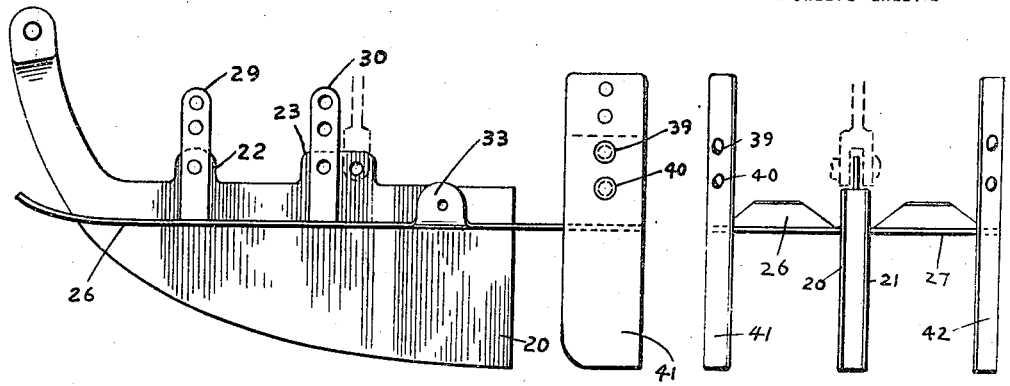
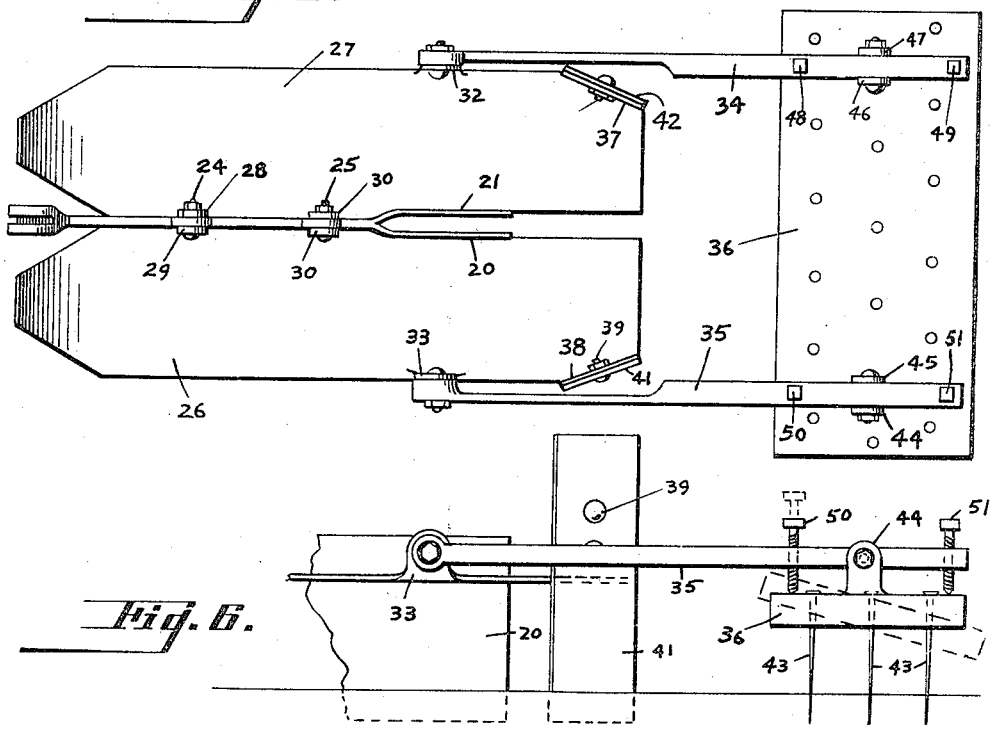
INVENTOR.
CHARLES H. ERWAY
BY
Carlos P. Griffin
ATTORNEY.

UNITED STATES PATENT OFFICE.

CHARLES H. ERWAY, OF TURLOCK, CALIFORNIA.

PLANTER-SHOE.

1,318,365.  Specification of Letters Patent.  Patented Oct. 14, 1919.

Application filed April 29, 1918. Serial No. 231,521.

*To all whom it may concern:*

Be it known that I, CHARLES H. ERWAY, citizen of the United States, residing at Turlock, in the county of Stanislaus, State of California, have invented a new and useful Planter-Shoe, of which the following is a specification, in such full and clear terms as will enable those skilled in the art to construct and use the same.

This invention relates to a shoe for planters, the object of which is to make a groove or furrow in the ground in which seeds or plants may be placed and covered.

An object of the invention is to provide the shoe with means whereby the soil will be gently pushed up against the sides of the plant or over the seed from the side of the groove or furrow leaving the top of the ground loose for the emergence or growth of the stalk, and in such condition as to retain the moisture.

Another object of the invention is to provide the shoe with means attached thereto to determine the depth of the groove made for the seed planting.

Another object of the invention is to provide means whereby the depth of the groove or furrow may be varied, as well as varying the depth of travel of the plows used for covering the seeds or plants.

Another object of the invention is to provide means whereby the ground may be harrowed down immediately following the covering of the seed, the harrow being detachable from the planter when plants are to be set out.

Other objects of the invention will appear as the description proceeds.

An embodiment of the invention is shown in the drawings in which the same reference numeral is applied to the same portion throughout, but I am aware that there may be modifications thereof.

Figure 1 is a perspective view of a horse drawn seeder showing one of the planting shoes in place, and its general relation to the apparatus, Fig. 2 is a side elevation on a larger scale of the seeder shoe with the depth gages removed, and showing its manner of connection to the cross rails of the seeder frame, Fig. 3 is a side elevation of the planter shoe showing the depth gage in position thereon, Fig. 4 is a part elevation of the planter shoe, and showing both depth gages, Fig. 5 is a plan view of the planter shoe showing the harrow connected therewith, and Fig. 6 is a side elevation of the rear portion of the planter shoe including the harrow and its drag links.

It will be understood by those skilled in the art that seeders are ordinarily provided with means for automatically supplying the seed to the shoe, but that such means forms no part of the present invention, and is therefore not illustrated, so that in the present case only the support for the shoe is shown.

The numeral 1 indicates a rectangular frame which has two cross pieces 2 and 3 at the front thereof, which cross pieces are connected to a pole 4, which pole is in turn connected to the team for pulling the seeder. The pole is also connected to the frame 1 by means of two braces 5 and 6, and it is supported by means of an axle 7 and wheels 8 and 9.

The cross bars 2 and 3 have holes therein at opposite ends to provide for the adjustment in position of the bar 10, which bar supports and directs the line of travel of the planter shoe 11. The bar 10 has four ears 12, 13, 14 and 15, which embrace the two cross bars 2 and 3, bolts 16 and 17 securing the bar 10 in a fixed position with respect to the cross bars. The shoe 11 has its upturned front end pivotally connected with the bar 10 at 19. Normally the shoe lies in a vertical plane, and at its rear has two members 20, 21 which form the furrow in which the seed is planted, the distance between said members 20, 21 being made greater or smaller as may be required by the object for which the planter shoe is made. That is, if the planter shoe is to be used for setting out plants by hand, the spaces between the members 20, 21 must be considerably greater than if seeds only are to be passed therethrough.

The planter shoe has two lugs 22 and 23 formed in its upper edge for the purpose of receiving bolts 24, 25, which bolts secure the depth gages 26, 27 in a given adjustment.

The depth gages are provided with upwardly extending lugs 28, 29, 30, 31, through which said bolts 24, 25 pass, and the adjustment of said depth gages is determined by the hole in which said bolts are placed. At the outer edges of the depth gages, there are two lugs 32, 33, to which are pivotally connected two links 34, 35 of the harrow 36. At the back of the depth gages, there are two lugs 37, 38, each of which has two holes therein to receive bolts 39, 40, and said bolts support two plows 41, 42. It will be observed that the plows 41, 42 are set slightly at an angle with respect to the line of travel of the shoe and they are slightly in the rear of the shoe so that as they move the dirt toward the center they will fill the furrow made by the shoe. The harrow 36 is provided with a plurality of sharp tines 43, and it has four upstanding ears 44, 45, 46, 47 to which the links 34 and 35 are pivotally connected, the object being to provide with the bolts 48 to 51 inclusive an adjustment of the position of said tines as may be desirable.

The lug 23 of the shoe also has a rod 53 pivotally connected therewith, and which rod extends through a slot in the bar 10. This rod is provided with a series of holes in one of which is placed a pin 54, and which supports a washer 55 to receive the pressure of the spiral spring 56, said spring also bearing upon the inside of the bar 10, the object being to push the shoe down into the ground to the depth determined by the two gages 26, 27. The seeds are ordinarily dropped into the shoe through the flexible tube consisting of the four funnels 57, 58, 59 and 60, which tubes are supported by means of the spiral springs 61 to 66 inclusive, in such a manner as to provide for the proper direction of the seed even when the shoe may be depressed considerably more or raised above the normal.

In operation the shoe is dragged over the ground by means of the frames supporting it. The spring 56 pushes the shoe down into the ground to the depth determined by the depth gages and the seeds are dropped in the space between the members 20, 21, immediately after which the plows 41, 42 gently push the ground over the seed from the side and the harrow subsequently smoothes the ground and leaves it in a friable condition.

Having thus described my invention what I claim as new and desire to secure by Letters Patent of the United States, is as follows, express reservation being made of permissible modifications:—

A planter shoe having a vertical member for producing a furrow, a pair of horizontally extending gages vertically adjustable on the vertical member and extending to the rear of the latter, a pair of adjustable furrow coverers carried by the gages, the coverers extending vertically and having their planes oppositely inclined to the line of the shoe, and a rake in the rear of the coverers pivotally connected with the outer edges of the gages.

In testimony whereof I have hereunto set my hand this 23rd day of April A. D. 1918.

CHARLES H. ERWAY.

Copies of this patent may be obtained for five cents each, by addressing the "Commissioner of Patents, Washington, D. C."